(12) United States Patent
Bae (10) Patent No.: US 12,071,319 B2
(45) Date of Patent: Aug. 27, 2024

(54) FILM DISCHARGING DEVICE COMPRISING FIRST AND SECOND DISCHARGING UNITS CONFIGURED TO RESPECTIVELY DISCHARGE A FILM PRODUCT GUIDED TO FIRST AND SECOND BRANCH PATHS

(71) Applicant: NPS CO., LTD., Cheongju-si (KR)

(72) Inventor: Seong Ho Bae, Daejeon (KR)

(73) Assignee: NPS CO., LTD., Cheongju-si (KR)

( * ) Notice: Subject to any disclaimer, the term of this patent is extended or adjusted under 35 U.S.C. 154(b) by 170 days.

(21) Appl. No.: 17/395,801

(22) Filed: Aug. 6, 2021

(65) Prior Publication Data
US 2022/0227593 A1 Jul. 21, 2022

(30) Foreign Application Priority Data

Jan. 18, 2021 (KR) .................. 10-2021-0007111
Jul. 16, 2021 (KR) .................. 10-2021-0093748

(51) Int. Cl.
| | |
|---|---|
| *B65H 5/26* | (2006.01) |
| *B65H 5/02* | (2006.01) |
| *B65H 11/00* | (2006.01) |
| *B65H 35/00* | (2006.01) |
| *G02F 1/13* | (2006.01) |

(52) U.S. Cl.
CPC ............ *B65H 5/26* (2013.01); *B65H 5/021* (2013.01); *B65H 11/005* (2013.01); *B65H 35/0006* (2013.01); *G02F 1/1303* (2013.01); *B65H 2301/44322* (2013.01); *B65H 2301/44552* (2013.01); *B65H 2801/61* (2013.01)

(58) Field of Classification Search
CPC ........ B65H 5/26; B65H 5/021; B65H 11/005; B65H 2301/44322; B65H 2301/44552; B65H 2801/61; B65H 29/18; B65H 29/16; B65H 29/242; B65H 31/3063; B65H 29/10; B65H 20/00
See application file for complete search history.

(56) References Cited

U.S. PATENT DOCUMENTS 3,222,964 A * 12/1965 Obenshan .............. B65H 29/51
83/156

FOREIGN PATENT DOCUMENTS

| CN | 104115209 A | * 10/2014 | ........... G02F 1/1303 |
| CN | 207061437 U | 3/2018 | |

(Continued)

*Primary Examiner* — Paul C Lee
(74) *Attorney, Agent, or Firm* — NKL LAW; Jae Youn Kim (57) ABSTRACT

Disclosed is a film discharging device including a supply unit configured to supply a film product, a branch unit including a branch conveyer configured to transfer a film product supplied from the supply unit, and a conveyer rotating member configured to selectively guide the branch conveyer passing through the branch conveyer to any one of a predetermined first branch path and a predetermined second branch path by rotating the branch conveyer in a predetermined forward direction or a reverse direction opposite to the forward direction to change an alignment angle of the branch conveyer, a first discharging unit configured to discharge the film product guided to the first branch path, and a second discharging unit configured to discharge the film product guided to the second branch path.

14 Claims, 8 Drawing Sheets

(56) References Cited

FOREIGN PATENT DOCUMENTS

| | | |
|---|---|---|
| CN | 210150370 U | 3/2020 |
| JP | 07-303928 A | 11/1995 |
| JP | 08-057817 A | 3/1996 |
| KR | 10-1115978 B1 | 2/2012 |
| KR | 10-2019-0078798 A | 7/2019 |

* cited by examiner

FILM DISCHARGING DEVICE COMPRISING FIRST AND SECOND DISCHARGING UNITS CONFIGURED TO RESPECTIVELY DISCHARGE A FILM PRODUCT GUIDED TO FIRST AND SECOND BRANCH PATHS

CROSS-REFERENCE TO RELATED APPLICATION

This application claims priority to and the benefit of Korean Patent Application No. 10-2021-0007111, filed on Jan. 18, 2021, and Korean Patent Application No. 10-2021-0093748, filed on Jul. 16, 2021, the disclosure of which is incorporated herein by reference in its entirety.

BACKGROUND

1. Technical Field

The present invention relates to a film discharging device.

2. Description of the Related Art

A cathode ray tube (CRT), which is one of conventionally used display devices, has been mainly used in a monitor such as a TV, a measuring device, and an information terminal device, but due to the large weight or size of the CRT itself, it is not possible to actively respond to demand for miniaturization and light reduction of electronic products.

In order to replace the CRT, a liquid crystal display device with advantages of small size and light weight has been actively developed, and recently, has been developed to sufficiently function as a flat panel display device, and demand for the CRT has gradually increased.

An image realization principle of the liquid crystal display is to use the optical anisotropy and polarization properties of liquid crystal, and the liquid crystal includes a thin and long molecular structure, and has anisotropy having directionality in molecular arrangement and polarization properties in which a direction of the molecular arrangement changes depending on the magnitude of an electric field when placed in the electric field. Thus, the liquid crystal display includes, as a required component, a liquid crystal panel including a pair of transparent insulating substrates, which face each other and have respective electric field generating electrodes, and a liquid crystal layer interposed between the transparent insulating substrates, and displays various images using light transmittance that is changed when a direction of alignment of liquid crystal molecules is artificially adjusted through a change in an electric field between the electric field generating electrodes.

In this case, polarizing films for visualizing a change in orientation of liquid crystal of the liquid crystal display are disposed above and below the liquid crystal panel, respectively and transmit a polarized component of light that coincides with a transmission axis of reflection and transmission axes, and thus a degree of light transmission is determined depending on arrangement of transmission axes of the two polarizing films and the characteristics of arrangement of liquid crystal.

In general, a polarizing film product applied to a liquid crystal panel is manufactured via a slitting process of slitting a polarizing film fabric to have a width corresponding to the width of the polarizing film product, and a cutting process of cutting the slit polarizing film fabric to have a length corresponding to the length of the polarizing film product. In addition, polarizing film products discharged from a film discharging device of a film cutting apparatus for performing the cutting process are sequentially loaded on a load bogie and are then transferred and fed.

However, there is a limit in a film load capacity of the load bogie. Thus, conventionally, when a predetermined amount of polarizing film products are loaded in the load bogie, a product collection process of transferring the load bogie to a predetermined collection place and then collecting the polarizing film product from the load bogie to empty the load bogie in the state in which the slitting and cutting processes on the polarizing film fabric are stopped. Accordingly, conventionally, the slitting and cutting processes need to be stopped during the product collection process, and thus there is a problem in that the productivity of polarizing film products is lowered.

SUMMARY

Therefore, the present invention has been made in view of the above problems, and it is an object of the present invention to provide a film discharging device that is improved to also continuously perform processes of manufacturing and processing film products when a product collection process of collecting the film products from a load bogie is performed.

In accordance with the present invention, the above and other objects can be accomplished by the provision of a film discharging device including a supply unit configured to supply a film product, a branch unit including a branch conveyer configured to transfer a film product supplied from the supply unit, and a conveyer rotating member configured to selectively guide the branch conveyer passing through the branch conveyer to any one of a predetermined first branch path and a predetermined second branch path by rotating the branch conveyer in a predetermined forward direction or a reverse direction opposite to the forward direction to change an alignment angle of the branch conveyer, a first discharging unit configured to discharge the film product guided to the first branch path, and a second discharging unit configured to discharge the film product guided to the second branch path.

According to an aspect of the present invention, the conveyer rotating member may be provided to rotate the branch conveyer using a fore end of the branch conveyer as a rotation shaft.

According to another aspect of the present invention, the conveyer rotating member may guide the film product to the first branch path by rotating the branch conveyer in any one direction of the forward direction and the reverse direction to lower a rear end of the branch conveyer to a predetermined first reference height, and the conveyer rotating member may guide the film product to the second branch path by rotating the branch conveyer in another direction of the forward direction and the reverse direction to raise the rear end of the branch conveyer to a predetermined second reference height.

According to another aspect of the present invention, the film discharging device may further include a first loading unit configured to load the film product discharged from the first discharging unit.

According to another aspect of the present invention, the first discharging unit may include a first discharging conveyer configured to load the film product guided to the first branch path on the first loading unit.

According to another aspect of the present invention, the first loading unit may include first wheels configured to transfer a corresponding first loading unit along a ground, and a first loading tray configured to load the film product.

According to another aspect of the present invention, the second discharging unit may include a bypass member configured to bypass and transfer the film product guided to the second branch path in a state of being spaced apart from the first loading unit by a predetermined distance or greater.

According to another aspect of the present invention, the bypass member may include a first bypass conveyer installed to be inclined upward by a predetermined inclination angle to raise the film product guided to the second branch path to an upper space of the first loading unit, and a second bypass conveyer installed in the upper space and configured to transfer the film product transferred from the first bypass conveyer to pass through the upper space.

According to another aspect of the present invention, the second discharging unit may further include a first contact member configured to cause the film product passing through the first bypass conveyer to be in close contact with the first bypass conveyer.

According to another aspect of the present invention, the first contact member may include at least one of a first suction unit configured to vacuum-absorb the film product in close contact with the first bypass conveyer, or a first touch roll configured to pressurize the film product towards the first bypass conveyer in close contact with the first bypass conveyer.

According to another aspect of the present invention, the film discharging device may further include a second loading unit configured to load the film product discharged from the second discharging unit, wherein the second discharging unit may further include a second discharging conveyer configured to load the film product bypassed by the bypass member on the second loading unit.

According to another aspect of the present invention, the second loading unit may include second wheels configured to transfer a corresponding second loading unit along a ground, and a second loading tray configured to load the film product.

According to another aspect of the present invention, the bypass member may further include a third bypass conveyer installed to be inclined downwards by a predetermined inclination angle and configured to transfer the film product transferred from the second bypass conveyer to the second discharging conveyer by lowering the film product to an installation height of the second discharging conveyer.

According to another aspect of the present invention, the second discharging unit may further include a second contact member configured to cause the film product passing through the third bypass conveyer to be in close contact with the third bypass conveyer.

According to another aspect of the present invention, the second contact member may include at least one of a second suction unit configured to vacuum-absorb the film product in close contact with the third bypass conveyer, or a second touch roll configured to pressurize the film product towards the third bypass conveyer in close contact with the third bypass conveyer.

BRIEF DESCRIPTION OF THE DRAWINGS

The above and other features of the inventive concept will become more apparent by describing in detail exemplary embodiments thereof with reference to the accompanying drawings, in which.

DETAILED DESCRIPTION

Hereinafter, the embodiments of the present disclosure will be described in detail with reference to the attached drawings. Here, when reference numerals are applied to constituents illustrated in each drawing, it should be noted that like reference numerals indicate like elements throughout the specification. In addition, in the following description of the present disclosure, a detailed description of known functions and configurations incorporated herein will be omitted when it may make the subject matter of the present disclosure unclear.

In describing the components of the embodiments of the present disclosure, terms such as first, second, A, B, (a), and (b) may be used. These terms are used to distinguish each component from other components, and the nature or order of the components is not limited by these terms.

In addition, unless defined otherwise, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
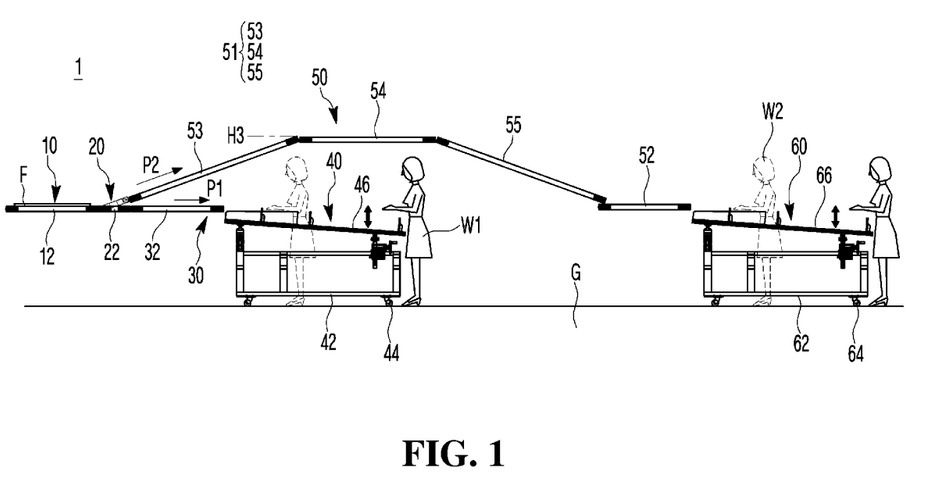
FIG. 1 is a schematic diagram showing the configuration of a film discharging device according to an embodiment of the present invention.
Figure 2:
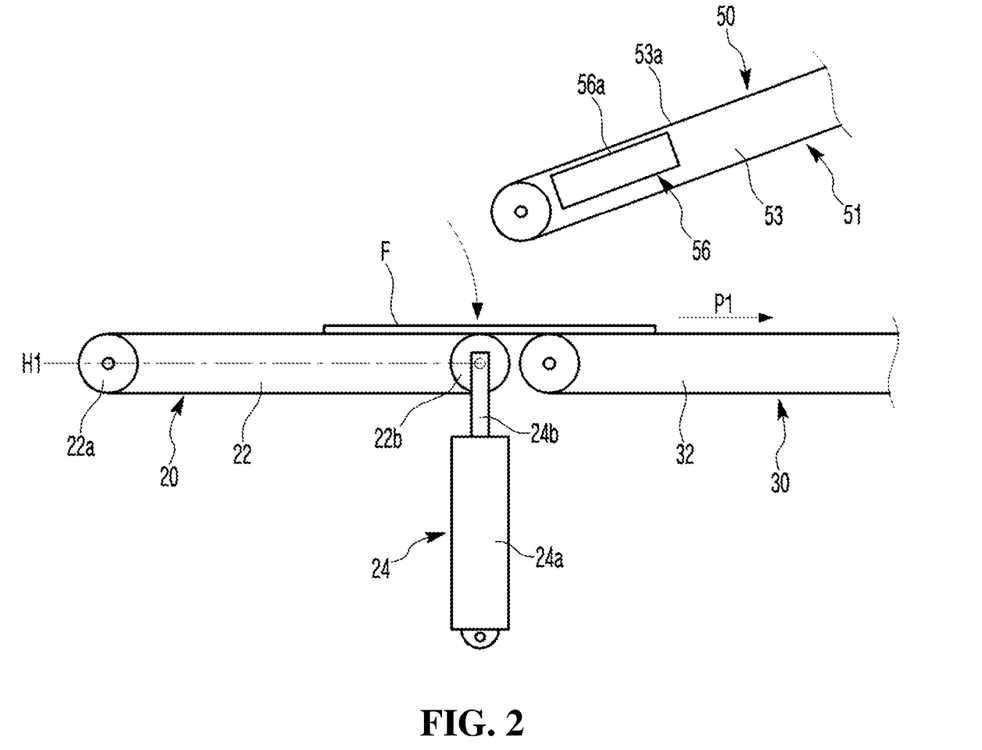
FIGS. 2 to 4 are diagrams for explaining a conveyer rotating member of a branch unit and a first contact member of a second discharging unit.
Figure 3:
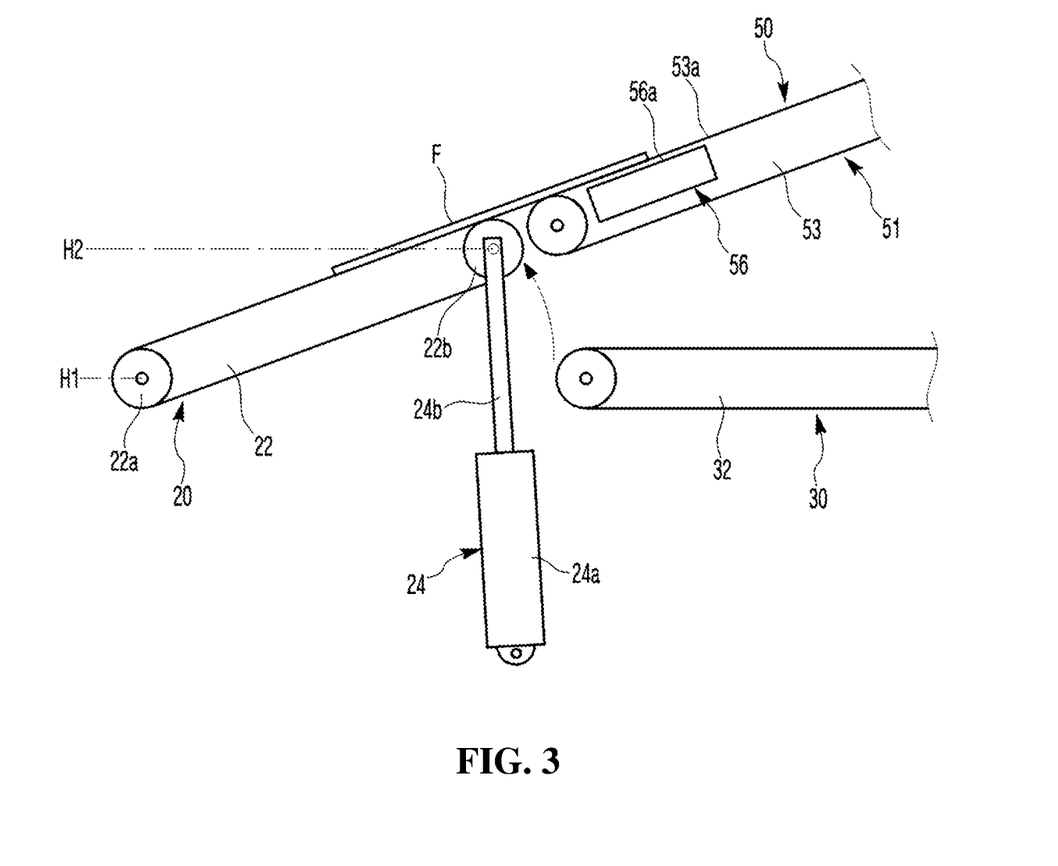
Figure 4:
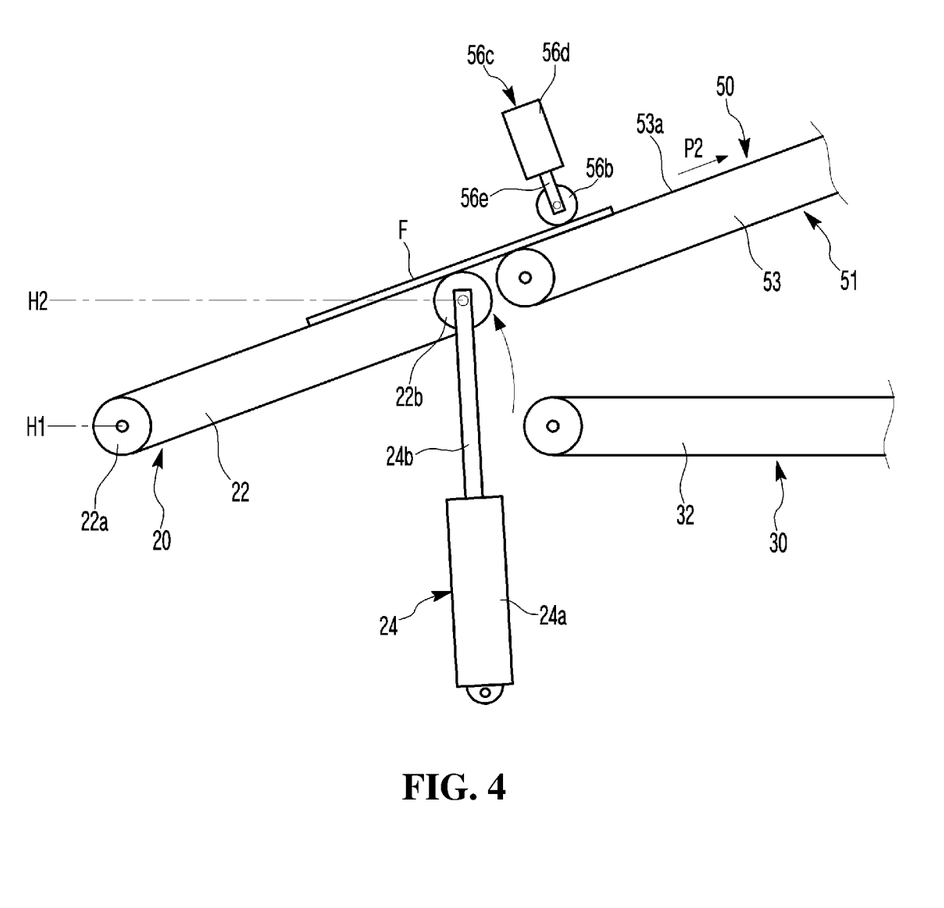
Figure 5:
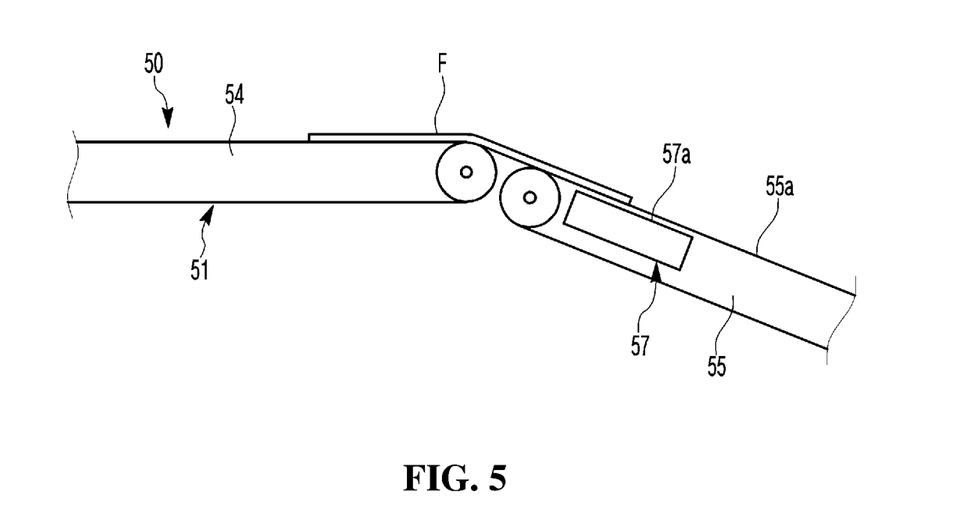
FIGS. 5 and 6 are diagrams for explaining a second contact member of a second discharging unit.
Figure 6:
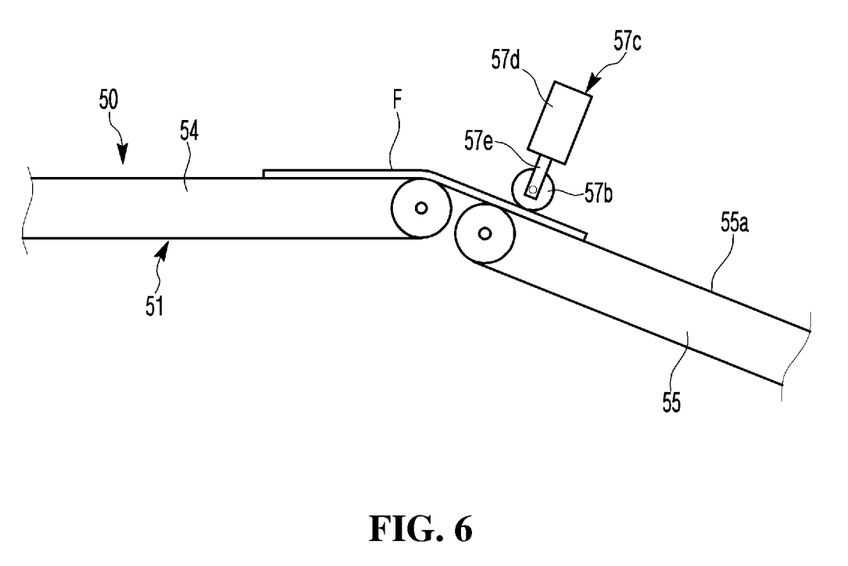

FIG. 1 is a schematic diagram showing the configuration of a film discharging device according to an embodiment of the present invention. FIGS. 2 to 4 are diagrams for explaining a conveyer rotating member of a branch unit and a first contact member of a second discharging unit. FIGS. 5 and 6 are diagrams for explaining a second contact member of a second discharging unit.

A film discharging device 1 according to an embodiment of the present invention may be a device applied to a film manufacturing system for cutting and processing a film fabric and processing the film fabric via various other methods to manufacture a film product F and may be provided to discharge and collect film products, which are manufactured in a predetermined processing form using various processing units included in the film manufacturing system, from the film manufacturing system. However, the present invention is not limited thereto, and the film discharging device 1 may be applied to various systems in which the film product F needs to be discharged, other than the film manufacturing system. Hereinafter, an example in which the film discharging device 1 is applied to the film manufacturing system will be described with regard to the present invention.

Referring to FIG. 1, the film discharging device 1 may include a supply unit 10 for supplying the film product F processed in a predetermined processing form, a branch unit 20 for selectively guiding the film product F supplied from the supply unit 10 to any one branch path of a predetermined first branch path P1 and a predetermined second branch path P2, a first discharging unit 30 installed on the first branch path P1 and configured to discharge the film product F guided to the first branch path P1 by the branch unit 20, a first loading unit 40 on which the film product F discharged from the first discharging unit 30 is loaded, a second discharging unit 50 installed on the second branch path P2 and configured to discharge the film product F guided to the second branch path P2 by the branch unit 20, and a second loading unit 60 on which the film product F discharged from the second discharging unit 50 is loaded.

First, the supply unit 10 may include a cutting unit for cutting and processing a film fabric, and a supply conveyer 12 for receiving the film product F that is processed and manufactured in a predetermined processing form from a processing unit (not shown) of a film manufacturing system (not shown) for processing other film fabrics and transferring the film product F towards the branch unit 20. A fore end of the supply conveyer 12 may be disposed in contact with the processing unit to accommodate the film product F passing through the processing unit thereon. A rear end of the supply conveyer 12 may be disposed in contact with a fore end of the branch unit 20. As such, the supply unit 10 may receive the film product F from the processing unit and may then transfer the film product F towards the branch unit 20 to supply the film product F to the branch unit 20.

Then, the branch unit 20 may include a branch conveyer 22, arrangement of which is variably provided to selectively transfer the film product F transferred from the supply conveyer 12 to any one branch path of the first branch path P1 and the second branch path P2.

The positions of the first branch path P1 and the second branch path P2 are not particularly limited. For example, as shown in FIG. 1, the first branch path P1 and the second branch path P2 may be set in such a way that the second branch path P2 is positioned higher than the first branch path P1 by a predetermined reference distance.

A fore end of the branch conveyer 22 may be disposed in contact with the rear end of the supply conveyer 12 to accommodate the film product F passing through the supply conveyer 12.

The branch unit 20 may further include a conveyer rotating member 24 for raising and lowering a rear end of the branch conveyer 22 by rotating the branch conveyer 22 using the fore end of the branch conveyer 22 as a rotation shaft to change an alignment angle of the branch conveyer 22.

The configuration of the conveyer rotating member 24 is not particularly limited. For example, as shown in FIG. 2, the conveyer rotating member 24 may be configured as a cylinder device. In this case, as shown in FIG. 2, the conveyer rotating member 24 may include a cylinder body 24a rotatably coupled to a bracket or other fixing members (not shown), and a cylinder rod 24b that reciprocates linearly within a predetermined stroke range by the cylinder body 24a.

As shown in FIG. 2, one end of the cylinder rod 24b may be coupled to the branch conveyer 22 to rotate the branch conveyer 22 in a predetermined forward or reverse direction using the fore end as the rotation shaft depending on a movement direction of the cylinder rod 24b when the corresponding cylinder rod 24b reciprocates linearly by the cylinder body 24a.

In this case, a first pulley 22a disposed at the fore end of the branch conveyer 22 among a pair of pulleys 22a and 22b disposed at both ends of the branch conveyer 22 may be rotatably fixed to the bracket and the fixing member (not shown). As such, the fore end of the branch conveyer 22 may function as a rotation shaft.

A second pulley 22b disposed at the rear end of the branch conveyer 22 may be coupled to one end of the cylinder rod 24b. As such, when the conveyer rotating member 24 is driven, the branch conveyer 22 may be selectively rotated in a predetermined forward direction or a reverse direction opposite to the forward direction based on the fore end depending on the movement direction of the cylinder rod 24b.

As shown in FIG. 2, in order to guide the film product F to the first branch path P1, the conveyer rotating member 24 may lower the rear end of the branch conveyer 22 to a predetermined first reference height H1 by rotating the branch conveyer 22 in any one direction (a clockwise direction in FIG. 2) of predetermined forward and reverse directions to cause the rear end of the branch conveyer 22 to be contact with the fore end of the first discharging unit 30. The first reference height H1 may be determined to accommodate the film product F passing through the rear end of the branch conveyer 22 at the fore end of the first discharging unit 30. For example, as shown in FIG. 2, the first reference height H1 may be determined to level the branch conveyer 22 with a ground G by positioning the fore end of the branch conveyer 22 at the same height as the rear end thereof.

As shown in FIG. 3, in order to guide the film product F to the second branch path P2, the conveyer rotating member 24 may raise the rear end of the branch conveyer 22 to a predetermined second reference height H2 by rotating the branch conveyer 22 in any one direction (a counterclockwise direction in FIG. 2) opposite to the above direction of predetermined forward and reverse directions to cause the rear end of the branch conveyer 22 to be in contact with the fore end of the second discharging unit 50. The second reference height H2 may be determined to accommodate the film product F passing through the rear end of the branch conveyer 22 at the fore end of the second discharging unit 50. For example, the second reference height H2 may be determined to incline the branch conveyer 22 upward at the same inclination angle as a first bypass conveyor 53 of the second discharging unit 50, which will be described later, by positioning the rear of the branch conveyer 22 higher than the fore end by the reference distance.

The branch unit 20 may selectively guide the film product F supplied from the supply unit 10 to any one branch path of the first branch path P1 and the second branch path P2 through the branch conveyer 22 and the conveyer rotating member 24.

Then, as shown in FIG. 1, the first discharging unit 30 may further include a first discharging conveyer 32 that receives the film product F guided to the first branch path P1 by the branch conveyer 22 and discharges the film product F along the first branch path P1. The fore end of the first discharging conveyer 32 may be disposed in contact with the rear end of the branch conveyer 22 positioned at the first reference height H1 to accommodate the film product F guided to the first branch path P1 by the branch conveyer 22.

Then, the first loading unit 40 may be provided to load and transfer the film product F. For example, the first loading unit 40 may have the same or similar structure to a load bogie that is commonly used to load and transfer the film product F. In this case, as shown in FIG. 1, the first loading unit 40 may include a first support frame 42 having a bottom surface on which a plurality of first wheels 44 is installed to move the corresponding first loading unit 40 along the ground G, and a first loading tray 46 installed at an upper end of the first support frame 42 to load the film product F discharged from the rear end of the first discharging conveyer 32 on an upper surface. The first loading unit 40 may be disposed to cause the fore end to be in contact with the rear end of the first discharging conveyer 32 so as to load the film product F discharged from the first discharging conveyer 32 on the first loading tray 46. As such, film products F discharged from the first discharging conveyer 32 may be sequentially loaded on the first loading tray 46.

Then, as shown in FIG. 1, the second discharging unit 50 may include a bypass member 51 for bypassing and transferring the film product F guided to the second branch path P2 by the branch conveyer 22 in a state of being spaced apart from the first loading unit 40 by a predetermined interval, and a second discharging conveyer 52 for discharging the film product F bypassed by the bypass member 51 along the second branch path P2 and loading the film product F on the second loading unit 60.

In general, when the film products discharged from the conveyer are disorderly loaded on the loading tray, there is a risk of the film products being damaged such as by being pushed or folded during a process of loading the film products on the loading tray and the quality of the film products is degraded. To overcome this, as shown in FIG. 1, after at least one of workers W1 and W2 are positioned at each of the loading units 40 and 60, a film alignment operation of aligning the film products F by the workers W1 and W2 to load the film products F on the loading trays 46 and 66 in a predetermined alignment form may be performed.

However, when the discharging units 30 and 50 and the film products F transferred by the discharging units 30 and 50 come into contact with the workers W1 and W2 who perform the film alignment operation at the loading units 40 and 60, there is a risk of the workers W1 and W2 being injured or the discharging units 30 and 50 and the film products F being damaged. To overcome this, as shown in FIG. 1, the second discharging unit 50 may include the bypass member 51 for bypassing the film product F guided to the second branch path P2 by the branch conveyer 22 to an upper space of the first loading unit 40 in the state of being spaced apart from the first loading unit 40 and the workers W1 who perform the alignment operation at the first loading unit 40 by a predetermined distance or greater. Here, the upper space of the first loading unit 40 may be a predetermined empty space positioned above the first loading unit 40 and the workers W1 without being limited thereto.

The configuration of the bypass member 51 is not particularly limited. For example, the bypass member 51 may include the first bypass conveyer 53 for raising the film product F guided to the second branch path P2 by the branch conveyer 22 to the upper space of the first loading unit 40, a second bypass conveyer 54 for transferring the film product F raised to the upper space of the first loading unit 40 by the first bypass conveyer 53 to pass through the upper space of the first loading unit 40 in the state in which the first loading unit 40 and the workers W1 are not in contact with each other, and a third bypass conveyer 55 for lowering the film product F passing through the upper space of the first loading unit 40 by the second bypass conveyer 54 to a height at which the second discharging conveyer 52 is installed.

As shown in FIG. 1, the first bypass conveyer 53 may be installed to be inclined upward by a predetermined inclination angle to raise the film product F guided to the second branch path P2 by the branch conveyer 22 to the upper space of the first loading unit 40 in the state of being spaced apart from the first loading unit 40 and the workers W1 by a predetermined distance or greater.

A fore end of the first bypass conveyer 53 may be positioned in contact with the rear end of the branch conveyer 22 positioned at the second reference height H2 to accommodate the film product F guided to the second branch path P2 by the branch conveyer 22. In response thereto, a rear end of the second bypass conveyer 54 may be positioned in the upper space of the first loading unit 40. In particular, the rear end of the second bypass conveyer 54 may be positioned at a third reference height H3 that is higher than the first loading unit 40 and the workers W1 by a predetermined height.

The first bypass conveyer 53 may stably raise the film product F transferred from the branch unit 20 to the upper space of the first loading unit 40 in the state in which the first loading unit 40 and the workers W1 are not in contact with each other.

The first bypass conveyer 53 may be installed to be inclined upward, and thus a slip occurs between the film product F and the first bypass conveyer 53 due to gravity when the film product F is raised by the first bypass conveyer 53, and thus there is a risk of the film product F being disorderly transferred. To overcome this, the second discharging unit 50 may further include a first contact member 56 provided to constantly transfer the film product F in the state of being in close contact with the first bypass conveyer 53.

The configuration of the first contact member 56 is not particularly limited. For example, the first contact member 56 may further include at least one of a first suction unit 56a for vacuum-absorbing the film product F in close contact with the first bypass conveyer 53, or a first touch roll 56b for pressurizing the film product F towards the first bypass conveyer 53 in close contact with the first bypass conveyer 53.

As shown in FIG. 3, the first suction unit 56a may be installed in the first bypass conveyer 53 to face an internal surface of a conveyer belt 53a of the first bypass conveyer 53. The conveyer belt 53a may include a plurality of suction holes (not shown) formed therethrough to apply vacuum pressure transferred from the first suction unit 56a. Thus, the film product F may pass through the first bypass conveyer 53 in close contact with an external surface of the conveyer belt 53a by being vacuum-absorbed by vacuum pressure applied to the suction holes.

As shown in FIG. 4, the first touch roll 56b may be installed outside the first bypass conveyer 53 to face the external surface of the conveyer belt 53a. The first touch roll 56b may be transferred by a first roll transferring member 56c close to the external surface of the conveyer belt 53a or away from the external surface of the conveyer belt 53a.

The configuration of the first roll transferring member 56c is not particularly limited. For example, as shown in FIG. 4, the first roll transferring member 56c may be configured as a cylinder device. In this case, the first roll transferring member 56c may include a cylinder body 56d fixedly installed to a bracket or other fixing members (not shown), and a cylinder rod 56e that reciprocates linearly within a predetermined stroke range by the cylinder body 56d and has one end coupled to the first touch roll 56b. When the first roll transferring member 56c is used, the first touch roll 56b may pressurize the film product F passing through the corresponding first touch roll 56b and the external surface of the conveyer belt 53a towards the external surface of the conveyer belt 53a in the state of being spaced apart from the external surface of the conveyer belt 53a by a predetermined distance corresponding to the thickness of the film product F. Thus, the film product F may pass through the first bypass conveyor 53 in the state of being in close contact with the external surface of the conveyer belt 53a by the pressurization force applied from the first touch roll 56b.

As shown in FIG. 1, the second bypass conveyer 54 may be installed in the upper space of the first loading unit 40 to cause the film product F passing through the first bypass conveyor 53 to pass through the upper space of the first loading unit 40 in the state of being spaced apart from the first loading unit 40 and the workers W1 by a predetermined distance or greater. In particular, the second bypass conveyer 54 may be installed to extend in a horizontal direction at the third reference height H3 to be positioned at the same height as the rear end of the second bypass conveyer 54, but the present invention is not limited thereto.

A fore end of the second bypass conveyer 54 may be disposed in contact with a rear end of the first bypass conveyor 53 to accommodate the film product F passing through the first bypass conveyor 53. In response thereto, a rear end of the second bypass conveyer 54 may be positioned closer to the second loading unit 60 than the first loading unit 40 and the workers W1.

The second bypass conveyer 54 may pass through the upper space of the first loading unit 40 in the state in which the film product F transferred from the first bypass conveyor 53 is not in contact with the first loading unit 40 and the workers W1.

As shown in FIG. 1, the third bypass conveyer 55 may be installed to be inclined downward by a predetermined inclination angle to lower the film product F passing through the second bypass conveyer 54 to an installation height of the second discharging conveyer 52 in the state of being spaced apart from the first loading unit 40 and the workers W1 by a predetermined distance or greater.

A fore end of the third bypass conveyer 55 may be positioned in contact with a rear end of the second bypass conveyer 54 to accommodate the film product F passing through the second bypass conveyer 54. In response thereto, the rear end of the third bypass conveyer 55 may be positioned close to the fore end of the second discharging conveyer 52.

The third bypass conveyer 55 may transfer the film product F transferred from the second discharging conveyer 52 to the second discharging conveyer 52 in the state in which the first loading unit 40 and the workers W1 are not in contact with each other.

The third bypass conveyer 55 may be installed to be inclined downward, and thus a slip occurs between the film product F and the third bypass conveyer 55 due to gravity when the film product F is lowered by the third bypass conveyer 55, and thus there is a risk of the film product F being disorderly transferred. To overcome this, the second discharging unit 50 may further include a second contact member 57 for causing the film product F to be in close contact with the third bypass conveyer 55.

The second contact member 57 may be provided to constantly transfer the film product F in the state in which the film product F is in close contact with the third bypass conveyer 55. For example, as shown in FIGS. 5 and 6, the second contact member 57 may further include at least one of a second suction unit 57a for vacuum-absorbing the film product F in close contact with the third bypass conveyer 55, or a second touch roll 57b for pressurizing the film product F towards the third bypass conveyer 55 in close contact with the third bypass conveyer 55.

As shown in FIG. 5, the second suction unit 57a may be installed in the third bypass conveyer 55 to face an internal surface of a conveyer belt 55a of the third bypass conveyer 55. The conveyer belt 55a may include a plurality of suction holes (not shown) formed therethrough to apply vacuum pressure transferred from the second suction unit 57a. Thus, the film product F may pass through the third bypass conveyer 55 in close contact with an external surface of the conveyer belt 55a by being vacuum-absorbed by vacuum pressure applied to the suction holes.

As shown in FIG. 6, the second touch roll 57b may be installed outside the third bypass conveyer 55 to face the external surface of the conveyer belt 55a. The second touch roll 57b may be transferred by a second roll transferring member 57c close to the external surface of the conveyer belt 55a or away from the external surface of the conveyer belt 55a.

The configuration of the second roll transferring member 57c is not particularly limited. For example, as shown in FIG. 6, the second roll transferring member 57c may be configured as a cylinder device. In this case, the second roll transferring member 57c may include a cylinder body 57d fixedly installed to a bracket or other fixing members (not shown), and a cylinder rod 57e that reciprocates linearly within a predetermined stroke range by the cylinder body 57d and has one end coupled to the second touch roll 57b. When the second roll transferring member 57c is used, the second touch roll 57b may pressurize the film product F passing between the corresponding second touch roll 57b and the external surface of the conveyer belt 55a towards the external surface of the conveyer belt 55a in the state of being spaced apart from the external surface of the conveyer belt 55a by a predetermined distance corresponding to the thickness of the film product F. Thus, the film product F may pass through the third bypass conveyer 55 in the state of being in close contact with the external surface of the conveyer belt 55a by the pressurization force applied from the second touch roll 57b.

As shown in FIG. 1, the fore end of the second discharging conveyer 52 may be positioned in contact with the rear end of the third bypass conveyer 55 to accommodate the film product F passing through the third bypass conveyer 55. The second discharging conveyer 52 may be installed at the same height as the first discharging conveyer 32, but the present invention is not limited thereto.

Then, the second loading unit 60 may be provided to load and transfer the film product F. For example, the second loading unit 60 may have the same or similar structure to a load bogie that is commonly used to load and transfer the film product F. In this case, the second loading unit 60 may include a second support frame 62 having a bottom surface on which a plurality of second wheels 64 is installed to move the corresponding second loading unit 60 along the ground G, and a second loading tray 66 installed at an upper end of the second support frame 62 to load the film product F discharged from the second discharging conveyer 52. The second loading unit 60 may be installed to cause the fore end to be in contact with the rear end of the second discharging conveyer 52 to load the film product F discharged from the rear end of the second discharging conveyer 52 on the upper surface of the second loading tray 66. As such, the film products F discharged from the second discharging conveyer 52 may be sequentially loaded on the second loading tray 66.

Figure 7:
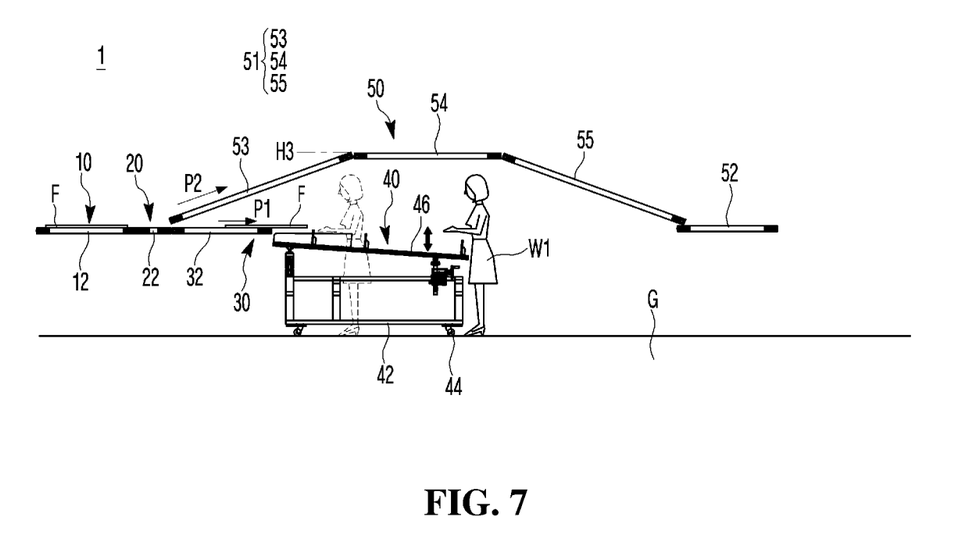
FIG. 7 is a diagram for explaining a method of discharging a film product along a predetermined first branch path using the branch unit shown in FIG. 1.
Figure 8:
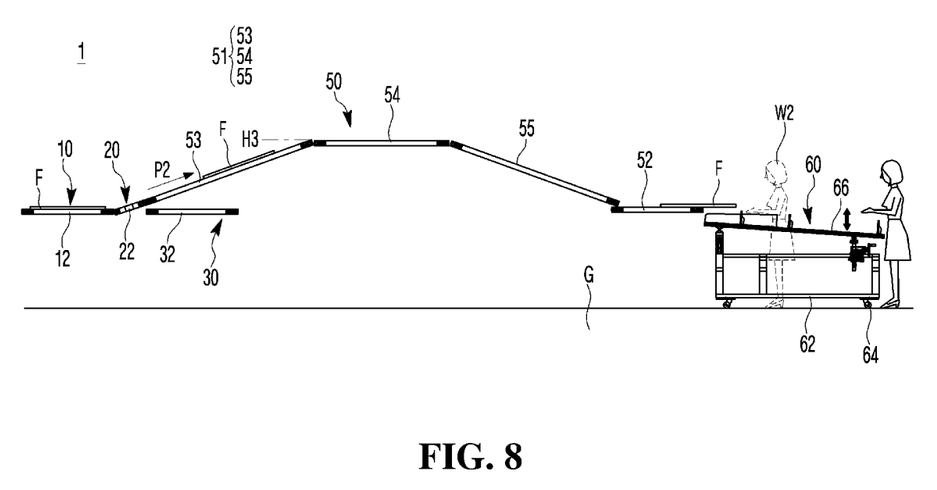
FIG. 8 is a diagram for explaining a method of discharging a film product along a predetermined second branch path using the branch unit shown in FIG. 1.

FIG. 7 is a diagram for explaining a method of discharging a film product along a predetermined first branch path using the branch unit shown in FIG. 1. FIG. 8 is a diagram for explaining a method of discharging a film product along a predetermined second branch path using the branch unit shown in FIG. 1.

Hereinafter, a method of selectively loading the film products F, which are manufactured in a predetermined processing form by a film manufacturing system, on any one of the first loading unit 40 and the second loading unit 60 and collecting the film products F using the film discharging device 1 will be described with reference to the drawings.

First, when the film products F are loaded on the second loading unit 60 by a predetermined film loading limit or greater and there is an available space for additionally loading the film products F in the first loading unit 40, the workers W2 who perform the film alignment operation in the second loading unit 60 may transfer the second loading unit 60 to a predetermined collection position and may then collect the film products F from the second loading tray 66 to empty the second loading tray 66, as shown in FIG. 7. As shown in FIG. 7, the workers W1 who perform the film alignment operation in the first loading unit 40 may control the branch unit 20 to guide the film product F to the first branch path P1 and to transfer the film product F to the first discharging unit 30 and may then sequentially load the film products F discharged from the first discharging conveyer 32 on the first loading tray 46 in a predetermined alignment form.

Then, when the film products F are loaded on the first loading unit 40 by a predetermined film loading limit or greater and there is an available space for additionally loading the film products F in the second loading unit 60, the workers W1 who perform the film alignment operation in the first loading unit 40 may transfer the first loading unit 40 to a predetermined collection position and may then collect the film products F from the first loading tray 46 to empty the first loading tray 46, as shown in FIG. 8. As shown in FIG. 8, the workers W2 who perform the film alignment operation in the second loading unit 60 may control the branch unit 20 to guide the film product F to the second branch path P2 and to transfer the film product F to the second discharging unit 50 and may then sequentially load the film products F discharged from the second discharging conveyer 52 on the second loading tray 66 in a predetermined alignment form.

As described above, the film discharging device 1 may selectively load the film products F on any one of the pair of loading units 40 and 60 by alternately using the pair of discharging units 30 and 50. When the film discharging device 1 is used, even if the film product F is collected from any one of the loading units 40 and 60, on which the film product F is loaded by a predetermined film loading limit or greater, the film product F may be continuously loaded on the other of the loading units 40 and 60. When the film discharging device 1 is used, a processing process of a film fabric may be continuously performed without interrupting the processing process in order to empty the loading units 40 and 60, thereby improving the productivity of the film product F.

The film discharging device according to the present invention may selectively load film products on any one of a pair of loading units by alternately using the pair of discharging units. When the film discharging device according to the present invention is used, even if the film product is collected from any one of the loading units, on which the film product is loaded by a predetermined film loading limit or greater, the film product may be continuously loaded on the other of the loading units. When the film discharging device according to the present invention is used, a processing process of a film fabric may be continuously performed without interrupting the processing process in order to empty the loading units, thereby improving the productivity of the film product.

The above description is merely illustrative of the technical idea of the present disclosure, and it would be obvious to one of ordinary skill in the art that various modifications and variations can be made without departing from the essential features of the present disclosure.

Accordingly, the embodiments disclosed in the present disclosure are not intended to limit the technical idea of the present disclosure, but to explain the technical idea, and the scope of the technical idea of the present disclosure is not limited by these embodiments. The scope of protection for the present disclosure should be determined based on the following claims, and all technical ideas falling within the scope of equivalents thereto should be interpreted as being included in the scope of the present disclosure.

What is claimed is:

1. A film discharging device comprising:
   a supply unit configured to supply a film product;
   a branch unit including a branch conveyer configured to transfer the film product supplied from the supply unit, and a conveyer rotating member configured to selectively guide the film product passing through the branch conveyer to any one of a predetermined first branch path and a predetermined second branch path by rotating the branch conveyer in a predetermined forward direction or a reverse direction opposite to the predetermined forward direction to change an alignment angle of the branch conveyer;
   a first discharging unit configured to discharge the film product guided to the first branch path; and
   a second discharging unit configured to discharge the film product guided to the second branch path,
   wherein the conveyer rotating member is further configured to rotate the branch conveyer using a fore end of the branch conveyer as a rotation shaft.

2. The film discharging device according to claim 1, wherein:
   the conveyer rotating member guides the film product to the first branch path by rotating the branch conveyer in any one direction of the predetermined forward direction and the reverse direction to lower a rear end of the branch conveyer to a predetermined first reference height; and
   the conveyer rotating member guides the film product to the second branch path by rotating the branch conveyer in another direction of the predetermined forward direction and the reverse direction to raise the rear end of the branch conveyer to a predetermined second reference height.

3. The film discharging device according to claim 1, further comprising:
   a first loading unit configured to load the film product discharged from the first discharging unit.

4. The film discharging device according to claim 3, wherein the first discharging unit includes a first discharging conveyer configured to load the film product guided to the first branch path on the first loading unit.

5. The film discharging device according to claim 3, wherein the first loading unit includes:
   first wheels configured to transfer a corresponding first loading unit along a ground; and
   a first loading tray configured to load the film product.

6. The film discharging device according to claim 3, wherein the second discharging unit includes a bypass member configured to bypass and transfer the film product guided to the second branch path in a state of being spaced apart from the first loading unit by a predetermined distance or greater.

7. The film discharging device according to claim 6, wherein the bypass member includes:
- a first bypass conveyer installed to be inclined upward by a predetermined inclination angle to raise the film product guided to the second branch path to an upper space of the first loading unit; and
- a second bypass conveyer installed in the upper space and configured to transfer the film product transferred from the first bypass conveyer to pass through the upper space.

8. The film discharging device according to claim 7, wherein the second discharging unit further includes a first contact member configured to cause the film product passing through the first bypass conveyer to be in close contact with the first bypass conveyer.

9. The film discharging device according to claim 8, wherein the first contact member includes at least one of:
- a first suction unit configured to vacuum-absorb the film product in close contact with the first bypass conveyer; or
- a first touch roll configured to pressurize the film product towards the first bypass conveyer in close contact with the first bypass conveyer.

10. The film discharging device according to claim 7, further comprising:
- a second loading unit configured to load the film product discharged from the second discharging unit, wherein the second discharging unit further includes a second discharging conveyer configured to load the film product bypassed by the bypass member on the second loading unit.

11. The film discharging device according to claim 10, wherein the second loading unit includes:
- second wheels configured to transfer a corresponding second loading unit along a ground; and
- a second loading tray configured to load the film product.

12. The film discharging device according to claim 10, wherein the bypass member further includes a third bypass conveyer installed to be inclined downwards by a predetermined inclination angle and configured to transfer the film product transferred from the second bypass conveyer to the second discharging conveyer by lowering the film product to an installation height of the second discharging conveyer.

13. The film discharging device according to claim 12, wherein the second discharging unit further includes a second contact member configured to cause the film product passing through the third bypass conveyer to be in close contact with the third bypass conveyer.

14. The film discharging device according to claim 13, wherein the second contact member includes at least one of:
- a second suction unit configured to vacuum-absorb the film product in close contact with the third bypass conveyer; or
- a second touch roll configured to pressurize the film product towards the third bypass conveyer in close contact with the third bypass conveyer.

* * * * *